United States Patent
Kim et al.

(10) Patent No.: US 9,503,224 B2
(45) Date of Patent: Nov. 22, 2016

(54) METHOD AND WIRELESS EQUIPMENT FOR PERFORMING HARQ

(71) Applicant: LG ELECTRONICS INC., Seoul (KR)

(72) Inventors: Hakseong Kim, Anyang-si (KR); Hanbyul Seo, Anyang-si (KR); Byounghoon Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 106 days.

(21) Appl. No.: 14/386,105

(22) PCT Filed: Mar. 19, 2013

(86) PCT No.: PCT/KR2013/002259
§ 371 (c)(1),
(2) Date: Sep. 18, 2014

(87) PCT Pub. No.: WO2013/141582
PCT Pub. Date: Sep. 26, 2013

(65) Prior Publication Data
US 2015/0043473 A1 Feb. 12, 2015

Related U.S. Application Data

(60) Provisional application No. 61/612,928, filed on Mar. 19, 2012, provisional application No. 61/623,585, filed on Apr. 13, 2012, provisional application No. 61/705,616, filed on Sep. 25, 2012, provisional application No. 61/709,937, filed on Oct. 4, 2012.

(51) Int. Cl.
*H04L 12/26* (2006.01)
*H04L 1/18* (2006.01)
(Continued)

(52) U.S. Cl.
CPC ............ *H04L 1/1825* (2013.01); *H04L 1/1812* (2013.01); *H04W 72/1205* (2013.01); *H04W 76/048* (2013.01)

(58) Field of Classification Search
CPC ..... H04L 1/18; H04L 1/1812; H04L 1/1825; H04L 5/0098; H04L 1/0057; H04L 1/1819; H04L 1/1864; H04L 1/1896; H04L 5/0055; H04L 2001/0092; H04W 72/12; H04W 72/1205; H04W 76/04; H04W 76/048; H04W 52/48
USPC ........ 370/252, 329–332, 336–337, 343–347; 455/450–452.2, 464, 509–511; 714/748–776
See application file for complete search history.

(56) References Cited

U.S. PATENT DOCUMENTS 8,797,954 B2 * 8/2014 Buckley ............... H04L 1/1607
370/328
2006/0252452 A1 11/2006 Umesh et al.
(Continued)

FOREIGN PATENT DOCUMENTS

KR 10-2006-0100286 A 9/2006
KR 10-2007-0120453 A 12/2007
KR 10-2010-0108459 A 10/2010

*Primary Examiner* — Tri H Phan
(74) *Attorney, Agent, or Firm* — Birch, Stewart, Kolasch & Birch, LLP

(57) ABSTRACT

A method and wireless equipment for performing a hybrid automatic repeat request (HARQ) in a wireless communication system are provided. The wireless equipment receives TB from a base station, and determines whether it is possible to completely perform decoding on the TB within a timing at which HARQ ACK/NACK for the TB is transmitted. If it is determined that it is difficult to completely perform the decoding on the TB, the wireless equipment transmits a discontinuous transmission (DTX) signal indicating the decoding on the TB was skipped to the base station.

8 Claims, 11 Drawing Sheets

(51) Int. Cl.
*H04W 72/12* (2009.01)
*H04W 76/04* (2009.01)

(56) References Cited

U.S. PATENT DOCUMENTS

| | | |
|---|---|---|
| 2008/0005638 A1 | 1/2008 | Kuo et al. |
| 2009/0221289 A1 | 9/2009 | Xu et al. |
| 2010/0074120 A1* | 3/2010 | Bergman ............ H04L 1/0057 370/244 |
| 2010/0202332 A1* | 8/2010 | Iwagami ............ H04W 52/325 370/311 |
| 2010/0246520 A1 | 9/2010 | Andersson |
| 2011/0223924 A1* | 9/2011 | Lohr ................ H04W 72/042 455/450 |
| 2011/0274023 A1* | 11/2011 | Roh .................... H04L 1/1692 370/311 |
| 2011/0300849 A1 | 12/2011 | Chan |
| 2012/0039275 A1* | 2/2012 | Chen .................. H04L 1/1607 370/329 |
| 2012/0076077 A1* | 3/2012 | Buckley ............. H04L 1/1607 370/328 |
| 2012/0327875 A1* | 12/2012 | Han .................. H04L 27/2602 370/329 |
| 2013/0039290 A1* | 2/2013 | Harrison ............ H04L 1/1861 370/329 |
| 2013/0242923 A1* | 9/2013 | Yang .................. H04L 1/1861 370/329 |
| 2015/0085714 A1* | 3/2015 | Liang ................. H04L 1/1614 370/280 |

\* cited by examiner

METHOD AND WIRELESS EQUIPMENT FOR PERFORMING HARQ

CROSS REFERENCE TO RELATED APPLICATIONS

This application is the National Phase of PCT/KR2013/002259 filed on Mar. 19, 2013, which claims priority under 35 U.S.C. 119(e) to U.S. Provisional Application Nos. 61/612,928 filed on Mar. 19, 2012; 61/623,585 filed on Apr. 13, 2012; 61/705,616 filed on Sep. 25, 2012, and 61/709,937 filed on Oct. 04, 2012, all of which are hereby expressly incorporated by reference into the present application.

BACKGROUND OF THE INVENTION

Field of the Invention

The present invention relates to wireless communications, and more particularly, to a method of performing a hybrid automatic repeat request (HARQ) in a wireless communication system, and a wireless device using the method.

Related Art

Long term evolution (LTE) based on 3rd generation partnership project (3GPP) technical specification (TS) release 8 is a promising next-generation mobile communication standard. Recently, LTE-advanced (LTE-A) based on 3GPP TS release 10 supporting multiple carriers is under standardization.

As disclosed in 3GPP TS 36.211 V10.2.0 (2011-06) "Evolved Universal Terrestrial Radio Access (E-UTRA); Physical Channels and Modulation (Release 10)", a physical channel of the 3GPP LTE/LTE-A can be classified into a downlink channel, i.e., a physical downlink shared channel (PDSCH) and a physical downlink control channel (PDCCH), and an uplink channel, i.e., a physical uplink shared channel (PUSCH) and a physical uplink control channel (PUCCH).

Since the PDCCH is monitored on the basis of blind decoding, it is important to acquire control information by rapidly decoding the PDCCH. A time required to decode data on a specific channel is called a processing time, which has a great effect on a design of an operation requiring a signal exchange between a base station and a user equipment, similarly to a hybrid automatic repeat request (HARQ).

A channel state may vary depending on a propagation delay. In a wireless communication system, a timing advance (TA) is set to adjust an uplink synchronization of each wireless device, by considering the propagation delay. This is to advance uplink transmission by the TA in a wireless device which experiences the propagation delay.

As a required cell coverage is increased, the TA value is also increased. Therefore, a processing time required for decoding may not be ensured due to the advanced uplink transmission.

SUMMARY OF THE INVENTION

The present invention provides a method of performing a hybrid automatic repeat request (HARQ) in a wireless communication system, and a wireless device using the method.

In an aspect, a method for performing a hybrid automatic repeat request (HARQ) in a wireless communication system is provided. The method includes receiving, by a wireless device, scheduling information for a transport block (TB) from a base station on a downlink control channel, receiving, by the wireless device, the TB from the base station, determining, by the wireless device, whether it is possible to perform decoding on the TB within a timing at which HARQ acknowledgement (ACK)/not-acknowledgement (NACK) for the TB is transmitted, and if it is determined that it is difficult to completely perform the decoding on the TB, transmitting, by the wireless device, a discontinuous transmission (DTX) signal indicating to skip the decoding on the TB to the base station.

The method may further includes discarding the TB if it is determined that it is difficult to completely perform the decoding on the TB.

The method may further includes storing a soft output of the TB in a buffer if it is determined that it is difficult to completely perform the decoding on the TB.

In another aspect, a wireless device for a wireless communication system is provided. The wireless device includes a radio frequency (RF) unit configured to transmit and receive a radio signal, and a processor operatively coupled to the RF unit and configured to receive scheduling information for a transport block (TB) from a base station on a downlink control channel, receive the TB from the base station, determine whether it is possible to perform decoding on the TB within a timing at which HARQ acknowledgement (ACK)/not-acknowledgement (NACK) for the TB is transmitted, and if it is determined that it is difficult to completely perform the decoding on the TB, transmit a discontinuous transmission (DTX) signal indicating to skip the decoding on the TB to the base station.

Communication reliability can be kept even if a processing time is delayed according to a wireless device's capacity or a channel state.

DESCRIPTION OF EXEMPLARY EMBODIMENTS

A wireless device may be fixed or mobile, and may be referred to as another terminology, such as a user equipment (UE), a mobile station (MS), a mobile terminal (MT), a user terminal (UT), a subscriber station (SS), a personal digital assistant (PDA), a wireless modem, a handheld device, etc. The wireless device may also be a device supporting only data communication such as a machine-type communication (MTC) device.

A base station (BS) is generally a fixed station that communicates with the wireless device, and may be referred to as another terminology, such as an evolved-NodeB (eNB), a base transceiver system (BTS), an access point, etc.

Hereinafter, it is described that the present invention is applied according to a 3rd generation partnership project (3GPP) long term evolution (LTE) based on 3GPP technical specification (TS) release 8 or 3GPP LTE-advanced (LTE-A) based on 3GPP TS release 10. However, this is for exemplary purposes only, and thus the present invention is also applicable to various wireless communication networks. In the following description, LTE and/or LTE-A are collectively referred to as LTE.

The wireless device may be served by a plurality of serving cells. Each serving cell may be defined with a downlink (DL) component carrier (CC) or a pair of a DL CC and an uplink (UL) CC.

The serving cell may be classified into a primary cell and a secondary cell. The primary cell operates at a primary frequency, and is a cell designated as the primary cell when an initial network entry process is performed or when a network re-entry process starts or in a handover process. The primary cell is also called a reference cell. The secondary cell operates at a secondary frequency. The secondary cell may be configured after an RRC connection is established, and may be used to provide an additional radio resource. At least one primary cell is configured always. The secondary cell may be added/modified/released by using higher-layer signaling (e.g., a radio resource control (RRC) message).

A cell index (CI) of the primary cell may be fixed. For example, a lowest CI may be designated as the CI of the primary cell. It is assumed hereinafter that the CI of the primary cell is 0 and a CI of the secondary cell is allocated sequentially starting from 1.

Figure 1:
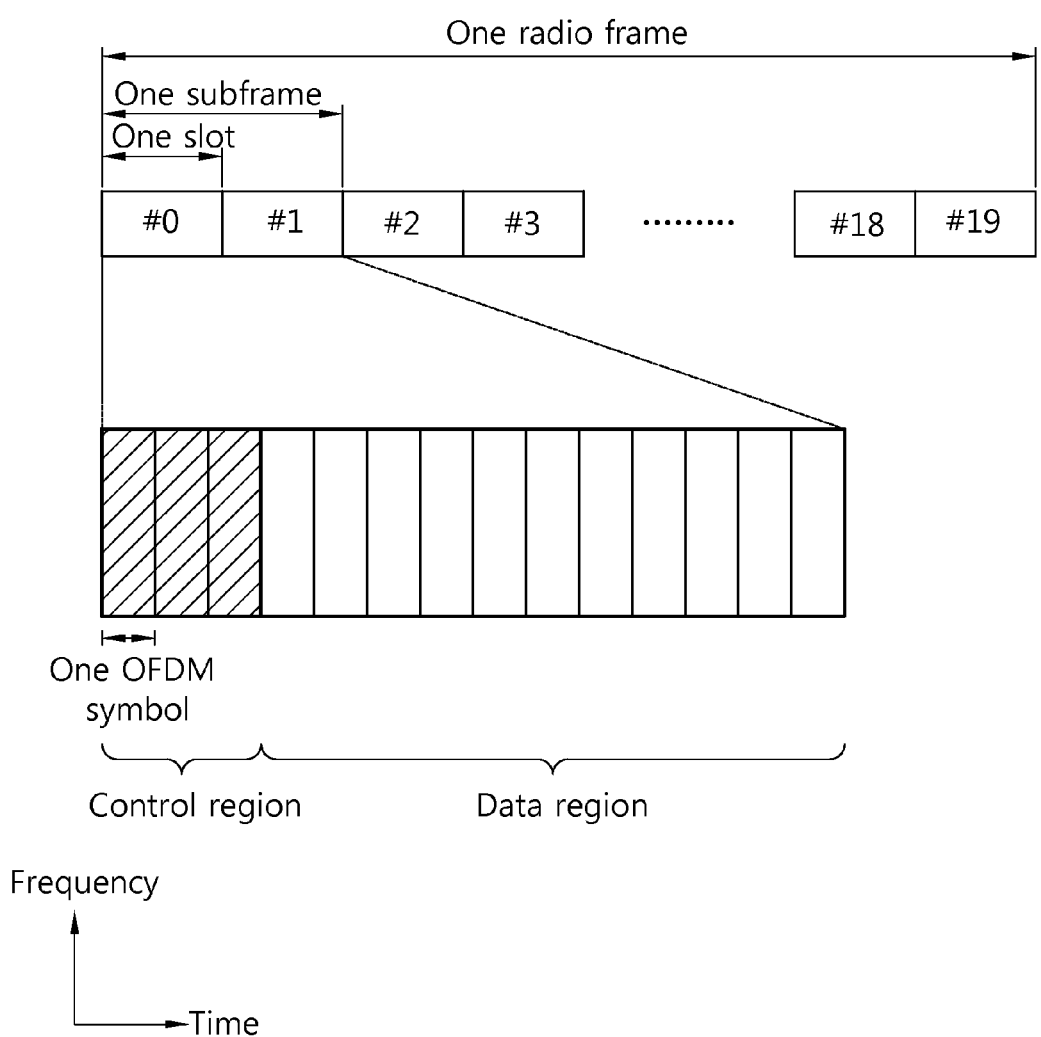
FIG. 1 shows a structure of a downlink (DL) radio frame in $3^{rd}$ generation partnership project (3GPP) long term evolution-advanced (LTE-A).

FIG. 1 shows a structure of a DL radio frame in 3GPP LTE-A. The section 6 of 3GPP TS 36.211 V10.2.0 (2011-06) "Evolved Universal Terrestrial Radio Access (E-UTRA); Physical Channels and Modulation (Release 10)" may be incorporated herein by reference.

A radio frame includes 10 subframes indexed with 0 to 9. One subframe includes 2 consecutive slots. A time required for transmitting one subframe is defined as a transmission time interval (TTI). For example, one subframe may have a length of 1 millisecond (ms), and one slot may have a length of 0.5 ms.

One slot may include a plurality of orthogonal frequency division multiplexing (OFDM) symbols in a time domain. Since the 3GPP LTE uses orthogonal frequency division multiple access (OFDMA) in a downlink (DL), the OFDM symbol is only for expressing one symbol period in the time domain, and there is no limitation in multiple access schemes or terminologies. For example, the OFDM symbol may also be referred to as another terminology such as a single carrier frequency division multiple access (SC-FDMA) symbol, a symbol period, etc.

Although it is described that one slot includes 7 OFDM symbols for example, the number of OFDM symbols included in one slot may vary depending on a length of a cyclic prefix (CP). According to 3GPP TS 36.211 V10.2.0, in case of a normal CP, one slot includes 7 OFDM symbols, and in case of an extended CP, one slot includes 6 OFDM symbols.

A resource block (RB) is a resource allocation unit, and includes a plurality of subcarriers in one slot. For example, if one slot includes 7 OFDM symbols in a time domain and the RB includes 12 subcarriers in a frequency domain, one RB can include 7×12 resource elements (REs).

A DL subframe is divided into a control region and a data region in the time domain. The control region includes up to first four OFDM symbols of a first slot in the subframe. However, the number of OFDM symbols included in the control region may vary. A physical downlink control channel (PDCCH) and other control channels are allocated to the control region, and a physical downlink shared channel (PDSCH) is allocated to the data region.

As disclosed in 3GPP TS 36.211 V10.2.0, examples of a physical control channel in 3GPP LTE/LTE-A include a physical downlink control channel (PDCCH), a physical control format indicator channel (PCFICH), and a physical hybrid-ARQ indicator channel (PHICH).

The PCFICH transmitted in a first OFDM symbol of the subframe carries a control format indicator (CFI) regarding the number of OFDM symbols (i.e., a size of the control region) used for transmission of control channels in the subframe. A wireless device first receives the CFI on the PCFICH, and thereafter monitors the PDCCH.

Unlike the PDCCH, the PCFICH does not use blind decoding, and is transmitted by using a fixed PCFICH resource of the subframe.

The PHICH carries a positive-acknowledgement (ACK)/negative-acknowledgement (NACK) signal for an uplink hybrid automatic repeat request (HARQ). The ACK/NACK signal for uplink (UL) data on a PUSCH transmitted by the wireless device is transmitted on the PHICH.

A physical broadcast channel (PBCH) is transmitted in first four OFDM symbols in a second slot of a first subframe of a radio frame. The PBCH carries system information necessary for communication between the wireless device and a BS. The system information transmitted through the PBCH is referred to as a master information block (MIB). In comparison thereto, system information transmitted on the PDCCH is referred to as a system information block (SIB).

Control information transmitted through the PDCCH is referred to as downlink control information (DCI). The DCI may include resource allocation of the PDSCH (this is referred to as a downlink (DL) grant), resource allocation of a PUSCH (this is referred to as an uplink (UL) grant), a set of transmit power control commands for individual UEs in any UE group, and/or activation of a voice over Internet protocol (VoIP).

In 3GPP LTE/LTE-A, transmission of a DL transport block is performed in a pair of the PDCCH and the PDSCH. Transmission of a UL transport block is performed in a pair of the PDCCH and the PUSCH. For example, the wireless device receives the DL transport block on a PDSCH indicated by the PDCCH. The wireless device receives a DL resource assignment on the PDCCH by monitoring the PDCCH in a DL subframe. The wireless device receives the DL transport block on a PDSCH indicated by the DL resource assignment.

Figure 2:
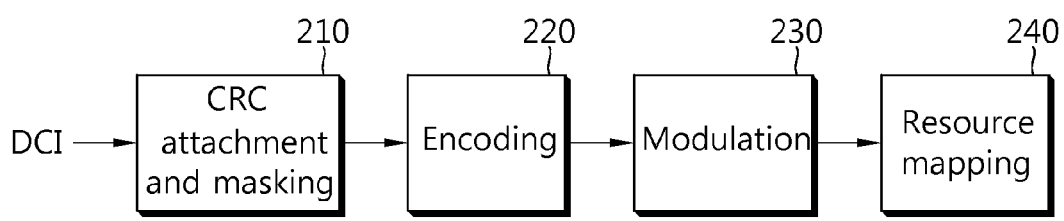
FIG. 2 is a block diagram showing a structure of a physical downlink control channel (PDCCH).

FIG. 2 is a block diagram showing a structure of a PDCCH.

The 3GPP LTE/LTE-A uses blind decoding for PDCCH detection. The blind decoding is a scheme in which a desired identifier is de-masked from a cyclic redundancy check (CRC) of a received PDCCH (referred to as a candidate PDCCH) to determine whether the PDCCH is its own control channel by performing CRC error checking.

A BS determines a PDCCH format according to DCI to be transmitted to a wireless device, attaches a CRC to control information, and masks a unique identifier (referred to as a radio network temporary identifier (RNTI)) to the CRC according to an owner or usage of the PDCCH (block 210).

If the PDCCH is for a specific wireless device, a unique identifier (e.g., cell-RNTI (C-RNTI)) of the wireless device may be masked to the CRC. Alternatively, if the PDCCH is for a paging message, a paging indication identifier (e.g., paging-RNTI (P-RNTI)) may be masked to the CRC. If the PDCCH is for system information, a system information identifier (e.g., system information-RNTI (SI-RNTI)) may be masked to the CRC. To indicate a random access response that is a response for transmission of a random access preamble of the wireless device, a random access-RNTI (RA-RNTI) may be masked to the CRC. To indicate a transmit power control (TPC) command for a plurality of wireless devices, a TPC-RNTI may be masked to the CRC.

When the C-RNTI is used, the PDCCH carries control information for a specific wireless device (such information is called UE-specific control information), and when other RNTIs are used, the PDCCH carries common control information received by all or a plurality of wireless devices in a cell.

The CRC-attached DCI is encoded to generate coded data (block 220). Encoding includes channel encoding and rate matching.

The coded data is modulated to generate modulation symbols (block 230).

The modulation symbols are mapped to physical resource elements (REs) (block 240). The modulation symbols are respectively mapped to the REs.

A control region in a subframe includes a plurality of control channel elements (CCEs). The CCE is a logical allocation unit used to provide the PDCCH with a coding rate depending on a radio channel state, and corresponds to a plurality of resource element groups (REGs). The REG includes a plurality of REs. According to an association relation of the number of CCEs and the coding rate provided by the CCEs, a PDCCH format and a possible number of bits of the PDCCH are determined.

One REG includes 4 REs. One CCE includes 9 REGs. The number of CCEs used to configure one PDCCH may be selected from a set {1, 2, 4, 8}. Each element of the set {1, 2, 4, 8} is referred to as a CCE aggregation level.

The BS determines the number of CCEs used in transmission of the PDCCH according to a channel state. For example, a wireless device having a good DL channel state can use one CCE in PDCCH transmission. A wireless device having a poor DL channel state can use 8 CCEs in PDCCH transmission.

A control channel consisting of one or more CCEs performs interleaving on an REG basis, and is mapped to a physical resource after performing cyclic shift based on a cell identifier (ID).

Figure 3:
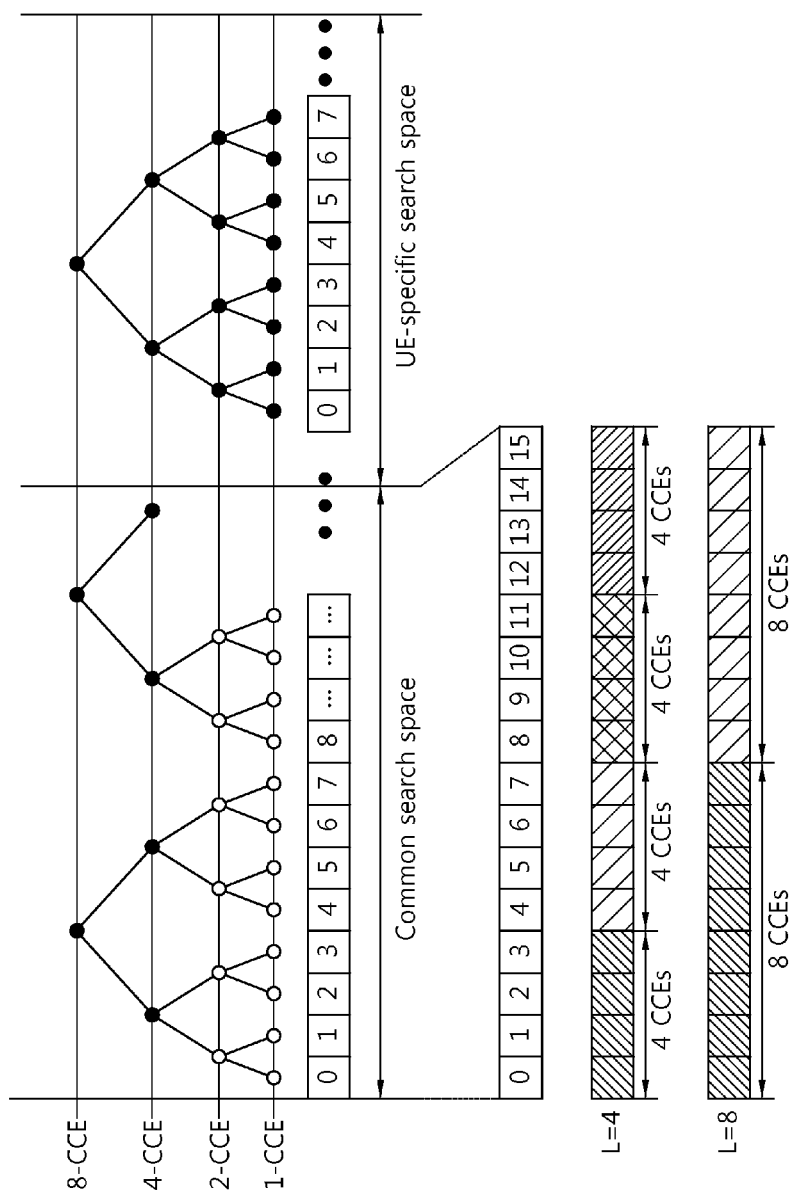
FIG. 3 shows an example of monitoring a PDCCH.

FIG. 3 shows an example of monitoring a PDCCH. The section 9 of 3GPP TS 36.213 V10.2.0 (2011-06) can be incorporated herein by reference.

The 3GPP LTE uses blind decoding for PDCCH detection. The blind decoding is a scheme in which a desired identifier is de-masked from a CRC of a received PDCCH (referred to as a candidate PDCCH) to determine whether the PDCCH is its own control channel by performing CRC error checking. A wireless device cannot know about a specific position in a control region in which its PDCCH is transmitted and about a specific CCE aggregation or DCI format used for PDCCH transmission.

A plurality of PDCCHs can be transmitted in one subframe. The wireless device monitors the plurality of PDCCHs in every subframe. Monitoring is an operation of attempting PDCCH decoding by the wireless device according to a format of the monitored PDCCH.

The 3GPP LTE uses a search space to reduce a load of blind decoding. The search space can also be called a monitoring set of a CCE for the PDCCH. The wireless device monitors the PDCCH in the search space.

The search space is classified into a common search space and a UE-specific search space. The common search space is a space for searching for a PDCCH having common control information and consists of 16 CCEs indexed with 0 to 15. The common search space supports a PDCCH having a CCE aggregation level of {4, 8}. However, a PDCCH (e.g., DCI formats 0, 1A) for carrying UE-specific information can also be transmitted in the common search space. The UE-specific search space supports a PDCCH having a CCE aggregation level of {1, 2, 4, 8}.

Table 1 shows the number of PDCCH candidates monitored by the wireless device.

TABLE 1

| Search Space Type | Aggregation level L | Size [In CCEs] | Number of PDCCH candidates | DCI formats |
|---|---|---|---|---|
| UE-specific | 1 | 6 | 6 | 0, 1, 1A, 1B, |
|  | 2 | 12 | 6 | 1D, 2, 2A |
|  | 4 | 8 | 2 |  |
|  | 8 | 16 | 2 |  |
| Common | 4 | 16 | 4 | 0, 1A, 1C, 3/3A |
|  | 8 | 16 | 2 |  |

A size of the search space is determined by Table 1 above, and a start point of the search space is defined differently in the common search space and the UE-specific search space. Although a start point of the common search space is fixed irrespective of a subframe, a start point of the UE-specific search space may vary in every subframe according to a UE identifier (e.g. C-RNTI), a CCE aggregation level, and/or a slot number in a radio frame. If the start point of the UE-specific search space exists in the common search space, the UE-specific search space and the common search space may overlap with each other.

In a CCE aggregation level L∈{1,2,3,4}, a search space $S^{(L)}_k$ is defined as a set of PDCCH candidates. A CCE corresponding to a PDCCH candidate m of the search space $S^{(L)}_k$ is given by Equation 1 below.

$$L \cdot \{(Y_k+m') \bmod \lfloor N_{CCE,k}/L \rfloor\}+i \qquad \text{[Equation 1]}$$

Herein, i=0, 1, . . . , L−1, m=0, . . . , $M^{(L)}$−1, and $N_{CCE,k}$ denotes the total number of CCEs that can be used for PDCCH transmission in a control region of a subframe k. The control region includes a set of CCEs numbered from 0 to $N_{CCE,k}$−1. $M^{(L)}$ denotes the number of PDCCH candidates in a CCE aggregation level L of a given search space.

If a carrier indicator field (CIF) is set to the wireless device, m'=m+$M^{(L)}n_{cif}$. Herein, $n_{cif}$ is a value of the CIF. If the CIF is not set to the wireless device, m'=m.

In a common search space, $Y_k$ is set to 0 with respect to two aggregation levels L=4 and L=8.

In a UE-specific search space of the aggregation level L, a variable $Y_k$ is defined by Equation 2 below.

$$Y_k=(A \cdot Y_{k-1}) \bmod D \qquad \text{[Equation 2]}$$

Herein, $Y_{-1}=n_{RNTI}\neq 0$, A=39827, D=65537, k=floor($n_s$/2), and $n_s$ denotes a slot number in a radio frame.

When the wireless device monitors the PDCCH by using the C-RNTI, a search space and a DCI format used in monitoring are determined according to a transmission mode of the PDSCH.

Figure 4:
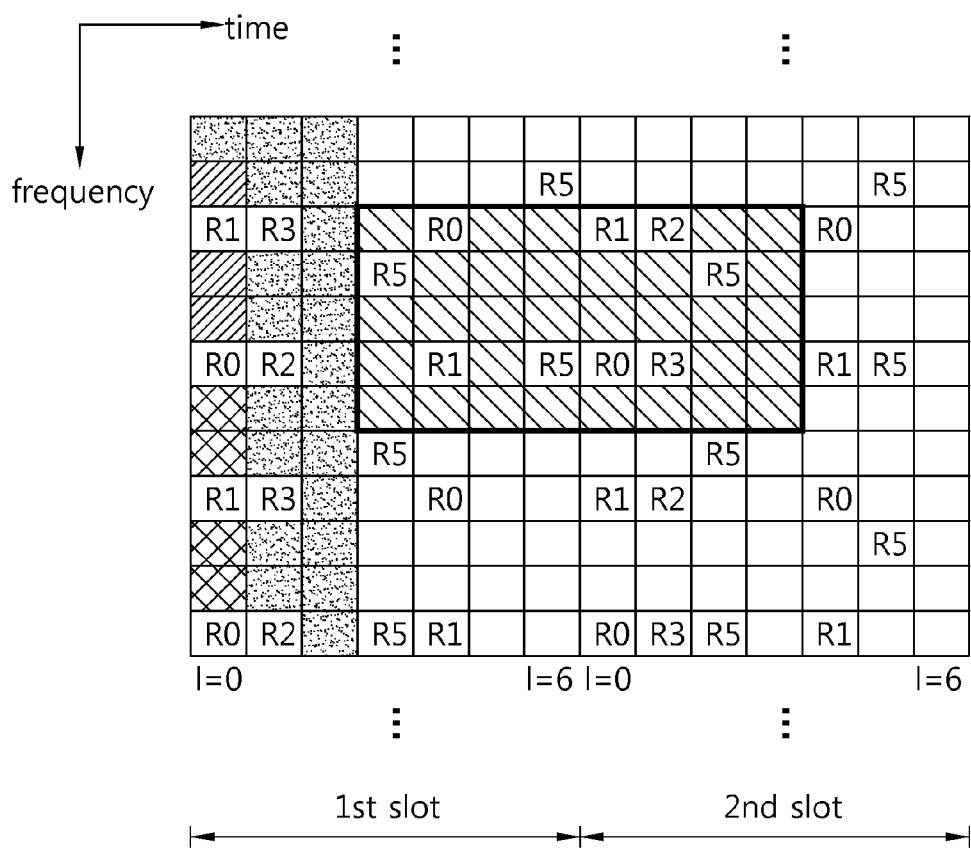
FIG. 4 shows an example of arranging a reference signal and a control channel in a DL subframe of 3GPP LTE.

FIG. 4 shows an example of arranging a reference signal and a control channel in a DL subframe of 3GPP LTE.

A control region (or a PDCCH region) includes first three OFDM symbols, and a data region in which a PDSCH is transmitted includes the remaining OFDM symbols.

A PCFICH, a PHICH, and/or a PDCCH are transmitted in the control region. A control format indictor (CFI) of the PCFICH indicates three OFDM symbols. A region excluding a resource in which the PCFICH and/or the PHICH are transmitted in the control region is a PDCCH region which monitors the PDCCH.

Various reference signals are transmitted in the subframe.

A cell-specific reference signal (CRS) may be received by all wireless devices in a cell, and is transmitted across a full downlink frequency band. In FIG. 4, 'R0' indicates a resource element (RE) used to transmit a CRS for a first antenna port, 'R1' indicates an RE used to transmit a CRS for a second antenna port, 'R2' indicates an RE used to transmit a CRS for a third antenna port, and 'R3' indicates an RE used to transmit a CRS for a fourth antenna port.

An RS sequence $r_{l,ns}(m)$ for a CRS is defined as follows.

$$r_{l,ns}(m) = \frac{1}{\sqrt{2}}(1-2\cdot c(2m)) + j\frac{1}{\sqrt{2}}(1-2\cdot c(2m+1)) \quad \text{[Equation 3]}$$

Herein, m=0, 1, . . . , $2N_{maxRB}-1$. $N_{maxRB}$ is the maximum number of RBs. ns is a slot number in a radio frame. l is an OFDM symbol index in a slot.

A pseudo-random sequence c(i) is defined by a length-31 gold sequence as follows.

$$c(n)=(x_1(n+Nc)+x_2(n+Nc)) \bmod 2$$

$$x_1(n+31)=(x_1(n+3)+x_1(n)) \bmod 2$$

$$x_2(n+31)=(x_2(n+3)+x_2(n+2)+x_2(n+1)+x_2(n)) \bmod 2 \quad \text{[Equation 4]}$$

Herein, Nc=1600, and a first m-sequence is initialized as $x_1(0)=1$, $x_1(n)=0$, m=1, 2, . . . , 30.

A second m-sequence is initialized as $c_{init}=2^{10}(7(ns+1)+1+1)(2N^{cell}_{ID}+1)+2N^{cell}_{ID}+N_{CP}$ at a start of each OFDM symbol. $N^{cell}_{ID}$ is a physical cell identifier (PCI). $N_{CP}=1$ in a normal CP case, and $N_{CP}=0$ in an extended CP case.

A UE-specific reference signal (URS) is transmitted in the subframe. Whereas the CRS is transmitted in the entire region of the subframe, the URS is transmitted in a data region of the subframe and is used to demodulate the PDSCH. In FIG. 4, 'R5' indicates an RE used to transmit the URS. The URS is also called a dedicated reference signal (DRS) or a demodulation reference signal (DM-RS).

The URS is transmitted only in an RB to which a corresponding PDSCH is mapped. Although R5 is indicated in FIG. 4 in addition to a region in which the PDSCH is transmitted, this is for indicating a location of an RE to which the URS is mapped.

The URS is used only by a wireless device which receives a corresponding PDSCH. A reference signal (RS) sequence $r_{ns}(m)$ for the URS is equivalent to Equation 3. In this case, m=0, 1, . . . , $12N_{PDSCH,RB}-1$, and $N_{PDSCH,RB}$ is the number of RBs used for transmission of a corresponding PDSCH. A pseudo-random sequence generator is initialized as $c_{init}=(\text{floor}(ns/2)+1)(2N^{cell}_{ID}+1)2^{16}+n_{RNTI}$ at a start of each subframe. $n_{RNTI}$ is an identifier of the wireless device.

The aforementioned initialization method is for a case where the URS is transmitted through the single antenna, and when the URS is transmitted through multiple antennas, the pseudo-random sequence generator is initialized as $c_{init}=(\text{floor}(ns/2)+1)(2N^{cell}_{ID}+1)2^{16}+n_{SCID}$ at a start of each subframe. $n_{SCID}$ is a parameter acquired from a DL grant (e.g., a DCI format 2B or 2C) related to PDSCH transmission.

The URS supports multiple input multiple output (MIMO) transmission. According to an antenna port or a layer, an RS sequence for the URS may be spread into a spread sequence as follows.

TABLE 2

| Layer | [w(0) w(1) w(2) w(3)] |
|---|---|
| 1 | [+1 +1 +1 +1] |
| 2 | [+1 −1 +1 −1] |
| 3 | [+1 +1 +1 +1] |
| 4 | [+1 −1 +1 −1] |
| 5 | [+1 +1 −1 −1] |
| 6 | [−1 −1 +1 +1] |
| 7 | [+1 −1 −1 +1] |
| 8 | [−1 +1 +1 −1] |

A layer may be defined as an information path which is input to a precoder. A rank is a non-zero eigenvalue of a MIMO channel matrix, and is equal to the number of layers or the number of spatial streams. The layer may correspond to an antenna port for identifying a URS and/or a spread sequence applied to the URS.

Meanwhile, the PDCCH is monitored in an area restricted to the control region in the subframe, and a CRS transmitted in a full band is used to demodulate the PDCCH. As a type of control data is diversified and an amount of control data is increased, scheduling flexibility is decreased when using only the existing PDCCH. In addition, in order to decrease an overhead caused by CRS transmission, an enhanced PDCCH (EPDCCH) is introduced.

Figure 5:
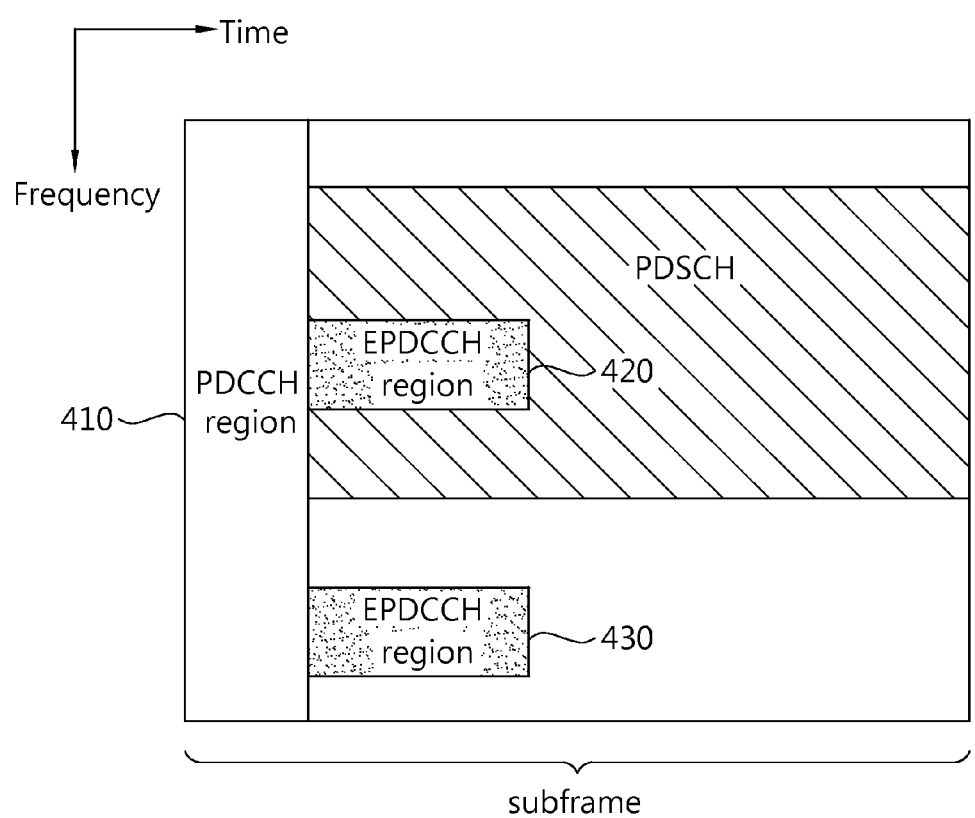
FIG. 5 is an example of a subframe having an enhanced PDCCH (EPDCCH).

FIG. 5 is an example of a subframe having an EPDCCH.

The subframe may include zero or one PDCCH region 410 and zero or more EPDCCH regions 420 and 430.

The EPDCCH regions 420 and 430 are regions in which a wireless device monitors the EPDCCH. The PDCCH region 410 is located in up to first four OFDM symbols of the subframe, whereas the EPDCCH regions 420 and 430 may be flexibly scheduled in an OFDM symbol located after the PDCCH region 410.

One or more EPDCCH regions 420 and 430 may be assigned to the wireless device. The wireless device may monitor EPDDCH data in the assigned EPDCCH regions 420 and 430.

The number/location/size of the EPDCCH regions 420 and 430 and/or information regarding a subframe for monitoring the EPDCCH may be reported by a BS to the wireless device by using a radio resource control (RRC) message or the like.

In the PDCCH region 410, a PDCCH may be demodulated on the basis of a CRS. In the EPDCCH regions 420 and 430, instead of the CRS, a DM-RS may be defined for demodulation of the EPDCCH. An associated DM-RS may be transmitted in the EPDCCH regions 420 and 430.

An RS sequence for the associated DM-RS is equivalent to Equation 3. In this case, m=0, 1, . . . , $12N_{RB}-1$, and $N_{RB}$ is a maximum number of RBs. A pseudo-random sequence generator may be initialized as $c_{init}=(\text{floor}(ns/2)+1)(2 N_{EPDCCH,ID}+1)2^{16}+n_{EPDCCH,SCID}$ at a start of each subframe. ns is a slot number of a radio frame. $N_{EPDCCH,ID}$ is a cell index related to a corresponding EPDCCH region. $n_{EPDCCH,SCID}$ is a parameter given from higher layer signaling.

Each of the EPDCCH regions 420 and 430 may be used to schedule a different cell. For example, an EPDCCH in the EPDCCH region 420 may carry scheduling information for a primary cell, and an EPDCCH in the EPDCCH region 430 may carry scheduling information for a secondary cell.

When the EPDCCH is transmitted through multiple antennas in the EPDCCH regions 420 and 430, the same precoding as that used in the EPDCCH may be applied to a DM-RS in the EPDCCH regions 420 and 430.

Comparing with a case where the PDCCH uses a CCE as a transmission resource unit, a transmission resource unit for the EPDCCH is called an enhanced control channel element (ECCE). An aggregation level may be defined as a resource unit for monitoring the EPDCCH. For example, when 1 ECCE is a minimum resource for the EPDCCH, it may be defined as an aggregation level L={1, 2, 4, 8, 16}.

Hereinafter, an EPDDCH search space may correspond to an EPDCCH region. In the EPDCCH search space, one or more EPDCCH candidates may be monitored for each one or more aggregation levels.

Now, a method of determining a transport block size (TBS) will be described with reference to the section 7.1.7 of 3GPP TS 36.213 V10.2.0 (2011-06).

First, a wireless device receives a DL grant on a PDCCH, and determines the TBS. Then, the wireless device receives a transport block on a PDSCH on the basis of the determined TBS.

The DL grant includes a modulation and coding scheme (MCS) index IMCS and the number NPRB of allocated RBs. The wireless device determines a modulation order and an TBS index ITBS from IMCS as shown in the following table.

TABLE 3

| MCS index $I_{MCS}$ | Modulation order | TBS index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 10 |
| 11 | 4 | 11 |
| 12 | 4 | 12 |
| 13 | 4 | 13 |
| 14 | 4 | 14 |
| 15 | 4 | 15 |
| 16 | 4 | 16 |
| 17 | 6 | 17 |
| 18 | 6 | 18 |
| 19 | 6 | 19 |
| 20 | 6 | 20 |
| 21 | 6 | 21 |
| 22 | 6 | 22 |
| 23 | 6 | 23 |
| 24 | 6 | 24 |
| 25 | 6 | 25 |
| 26 | 6 | 26 |
| 27 | 6 | 27 |
| 28 | 6 | 28 |
| 29 | 2 | reserved |
| 30 | 4 | reserved |
| 31 | 6 | reserved |

In 3GPP TS 36.213, the TBS is pre-defined according to the TBS index $I_{TBS}$ and the number $N_{PRB}$ of the allocated RBs, where $1<=N_{PRB}<=110$. The following table shows an example of $1<=N_{PRB}<=10$ in the defined TBS.

TABLE 4

| | $N_{PRB}$ | | | | | | | | | |
|---|---|---|---|---|---|---|---|---|---|---|
| $I_{TBS}$ | 1 | 2 | 3 | 4 | 5 | 6 | 7 | 8 | 9 | 10 |
| 0 | 16 | 32 | 56 | 88 | 120 | 152 | 176 | 208 | 224 | 256 |
| 1 | 24 | 56 | 88 | 144 | 176 | 208 | 224 | 256 | 328 | 344 |
| 2 | 32 | 72 | 144 | 176 | 208 | 256 | 296 | 328 | 376 | 424 |
| 3 | 40 | 104 | 176 | 208 | 256 | 328 | 392 | 440 | 504 | 568 |
| 4 | 56 | 120 | 208 | 256 | 328 | 408 | 488 | 552 | 632 | 696 |
| 5 | 72 | 144 | 224 | 328 | 424 | 504 | 600 | 680 | 776 | 872 |
| 6 | 328 | 176 | 256 | 392 | 504 | 600 | 712 | 808 | 936 | 1032 |
| 7 | 104 | 224 | 328 | 472 | 584 | 712 | 840 | 968 | 1096 | 1224 |
| 8 | 120 | 256 | 392 | 536 | 680 | 808 | 968 | 1096 | 1256 | 1384 |
| 9 | 136 | 296 | 456 | 616 | 776 | 936 | 1096 | 1256 | 1416 | 1544 |
| 10 | 144 | 328 | 504 | 680 | 872 | 1032 | 1224 | 1384 | 1544 | 1736 |
| 11 | 176 | 376 | 584 | 776 | 1000 | 1192 | 1384 | 1608 | 1800 | 2024 |
| 12 | 208 | 440 | 680 | 904 | 1128 | 1352 | 1608 | 1800 | 2024 | 2280 |
| 13 | 224 | 488 | 744 | 1000 | 1256 | 1544 | 1800 | 2024 | 2280 | 2536 |
| 14 | 256 | 552 | 840 | 1128 | 1416 | 1736 | 1992 | 2280 | 2600 | 2856 |
| 15 | 280 | 600 | 904 | 1224 | 1544 | 1800 | 2152 | 2472 | 2728 | 3112 |
| 16 | 328 | 632 | 968 | 1288 | 1608 | 1928 | 2280 | 2600 | 2984 | 3240 |
| 17 | 336 | 696 | 1064 | 1416 | 1800 | 2152 | 2536 | 2856 | 3240 | 3624 |
| 18 | 376 | 776 | 1160 | 1544 | 1992 | 2344 | 2792 | 3112 | 3624 | 4008 |
| 19 | 408 | 840 | 1288 | 1736 | 2152 | 2600 | 2984 | 3496 | 3880 | 4264 |
| 20 | 440 | 904 | 1384 | 1864 | 2344 | 2792 | 3240 | 3752 | 4136 | 4584 |
| 21 | 488 | 1000 | 1480 | 1992 | 2472 | 2984 | 3496 | 4008 | 4584 | 4968 |
| 22 | 520 | 1064 | 1608 | 2152 | 2664 | 3240 | 3752 | 4264 | 4776 | 5352 |
| 23 | 552 | 1128 | 1736 | 2280 | 2856 | 3496 | 4008 | 4584 | 5160 | 5736 |
| 24 | 584 | 1192 | 1800 | 2408 | 2984 | 3624 | 4264 | 4968 | 5544 | 5992 |
| 25 | 616 | 1256 | 1864 | 2536 | 3112 | 3752 | 4392 | 5160 | 5736 | 6200 |
| 26 | 712 | 1480 | 2216 | 2984 | 3752 | 4392 | 5160 | 5992 | 6712 | 7480 |

The wireless device acquires desired information from a BS, by demodulating and decoding a DL transport block on a PDSCH by the use of a channel estimation value acquired from a DL reference signal and DCI on a DL control channel.

Since the DL control channel (e.g., PDCCH, EPDCCH) is monitored based on blind decoding, it is important to acquire the DCI by rapidly decoding the DL control channel. A time required to decode data on a specific channel is called a processing time, which has a great effect on a design of an operation requiring a signal exchange between the BS and a UE similarly to HARQ.

Figure 6:
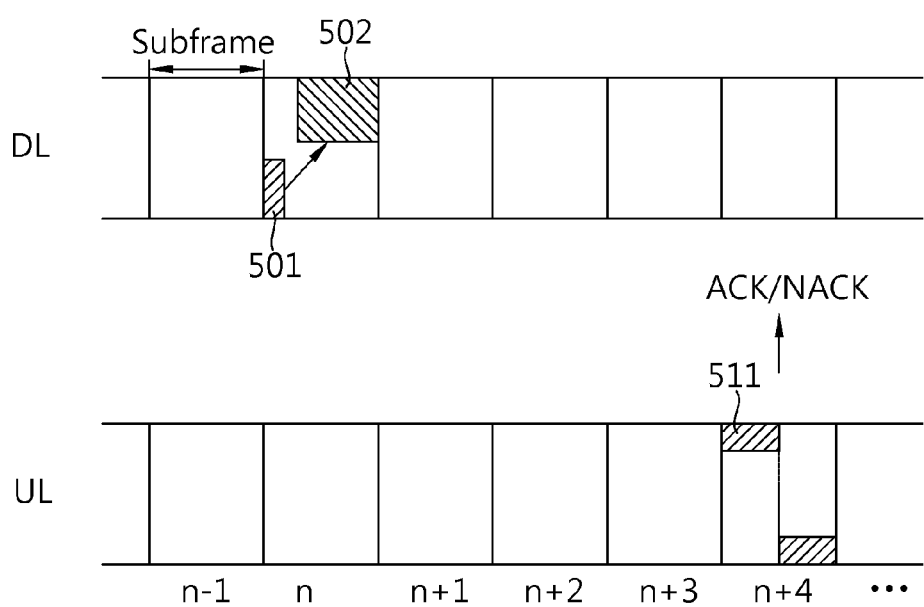
FIG. 6 shows a DL hybrid automatic repeat request (HARQ) operation in 3GPP LTE.

FIG. 6 shows a DL HARQ operation in 3GPP LTE.

A wireless device monitors a PDCCH, and receives a DL grant including a DL resource allocation on a PDCCH 501 in an nth DL subframe. The wireless device receives a DL transport block through a PDSCH 502 indicated by the DL resource allocation.

The wireless device transmits an ACK/NACK signal for the DL transport block on a PUCCH 511 in an (n+4)th UL subframe. The ACK/NACK signal corresponds to an ACK signal when the DL transport block is successfully decoded, and corresponds to a NACK signal when the DL transport block fails in decoding. Upon receiving the NACK signal, a BS may retransmit the DL transport block until the ACK signal is received or until the number of retransmission attempts reaches its maximum number.

In 3GPP LTE, a time required to transmit the ACK/NACK signal after the wireless device ends decoding of the DL transport block is defined as 4 subframes. The 4 subframes are a fixed value in case of frequency division duplex (FDD), but are variable in case of time division duplex (TDD).

The following table shows a DL subframe n-k associated with a UL subframe n depending on the UL-DL configuration in 3GPP LTE. Herein, k∈K, where M is the number of elements of a set K.

TABLE 5

| UL-DL configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

For example, in the UL-DL configuration 5, the UL subframe 2 may be associated with 9 DL subframes {13, 12,9,8,7,5,4,11,6}. ACK/NACK for the associated DL subframe may be transmitted in the UL subframe 2.

However, a channel state may vary depending on a movement of the wireless device, a wide coverage, a propagation delay, etc. In a wireless communication system, a timing advance (TA) is set to adjust a UL synchronization of each wireless device, by considering the propagation delay. This is to advance UL transmission by the TA in the wireless device which experiences the propagation delay. However, as a great TA is set and an EPDCCH is introduced, the 4 subframes conventionally used may not be enough to ensure a sufficient processing time.

Figure 7:
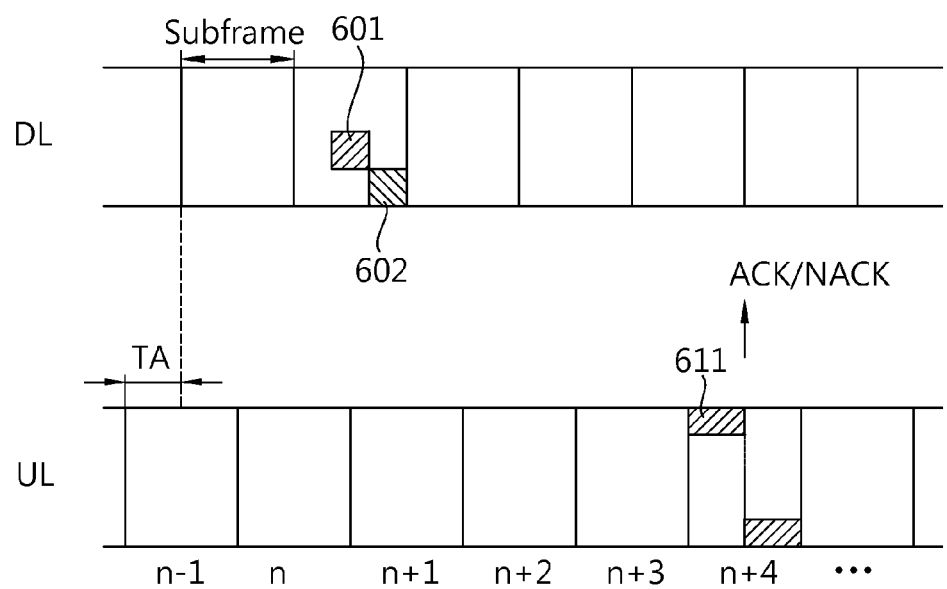
FIG. 7 shows time advance (TA)-based HARQ transmission.

FIG. 7 shows TA-based HARQ transmission.

A wireless device receives a DL grant on an EPDCCH 601 in a subframe n, and receives a DL transport block on a PDSCH 602. The wireless device may intend to transmit ACK/NACK in a subframe n+4, but 4 subframes may not be enough to ensure a sufficient processing time due to a great TA. This is called a decoding latency.

Figure 8:
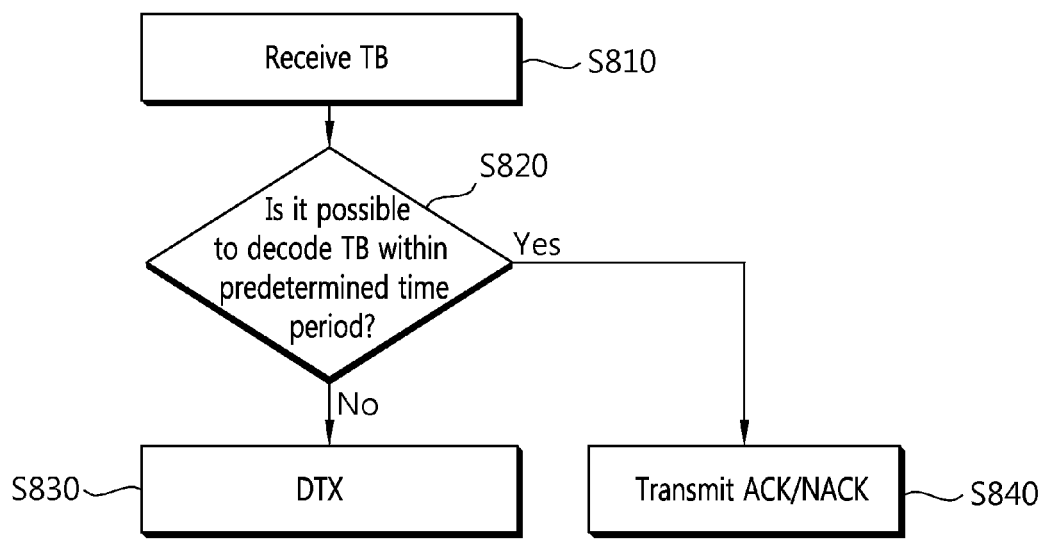
FIG. 8 shows a method of performing a HARQ according to an embodiment of the present invention.

FIG. 8 shows a method of performing a HARQ according to an embodiment of the present invention.

In step S810, a wireless device receives a transport block (TB) from a BS. The TB may be received on a PDSCH indicated by a PDCCH/EPDCCH.

In step S820, the wireless device decides whether it is possible to decode the TB within a predetermined time period. The predetermined time period may be a time duration before ACK/NACK is transmitted and after the TB is received. For example, if the TB is received in a subframe n and the ACK/NACK is transmitted in a subframe n+4, the determined time may indicate a time period of 4 subframes.

In step S830, if the wireless device checks a TB size and decides that it cannot completely decode the TB within the predetermined time period, discontinuous transmission (DTX) is performed. Herein, the DTX implies that ACK/NACK is not transmitted or a DTX statue is transmitted as the ACK/NACK. For example, the wireless device may not transmit the ACK/NACK in the subframe n+4.

In step S840, if the wireless device can decode the TB, ACK or NACK may be transmitted as ACK/NACK.

The wireless device may intentionally perform the DTX if the received TB has a size greater than or equal to a threshold. If the DTX is performed for a specific TB, the BS may regard that the wireless device has lost a DL control channel (i.e., PDCCH or EPDCCH) for scheduling the TB, and may transmit the TB as initial transmission. The wireless device may not store the TB in a buffer, and the BS may schedule next transmission by assuming that the TB is not stored by the wireless device in the buffer.

The DTX operation has an advantage in that the operation becomes simple since the wireless device can skip the decoding of the TB if the TB size exceeds the threshold. If persistent DTX is reported to a specific wireless device even though a channel state is good, the BS may decrease the TB size by assuming that the allocated TB size exceeds a possible decoding capability of the wireless device.

When the DTX is reported to the BS, the wireless device may report to the BS that a soft output of an initially received TB is stored in the wireless device. This information may help the BS to determine a redundancy version (RV) and a modulation and coding scheme (MCS) in next transmission.

The wireless device may provide the BS with information regarding DTX, whether PDSCH decoding is successful, a shortage of a PDSCH processing time, or a partial success of PDSCH decoding. The information may be transmitted through a PUCCH.

The proposed DTX operation may be used by the BS to recognize decoding capability of the wireless device. The wireless device receives a TB having a size greater than or equal to a threshold, and performs the DTX. If the wireless device repetitively performs the DTX, the BS recognizes a situation of the wireless device (e.g., TA, UE category, mobility, etc.). If it is determined that the wireless device cannot decode a TB having a TB size within a processing time period, the BS may decrease the TB size.

Herein, if the DTX is performed, the BS recognizes this as one of: i) a PDCCH/EPDCCH detection failure; and ii) a shortage of a processing time. To distinguish from DTX caused by the PDCCH/EPDCCH detection failure, if the processing time is insufficient, a state indicating the DTX may be provided by the wireless device to the BS as ACK/NACK. That is, this is because the DTX intentionally performed by the wireless device is different from a PDCCH detection error since PDCCH decoding is successful but initial transmission is required for other reasons.

The DTX may be interpreted that the wireless device requests the BS to transmit a smaller sized TB. Since it is difficult to perform decoding on a current sized TB, it may be interpreted that information which desires to transmit a smaller sized TB is included by considering a case where a channel state deteriorates.

Figure 9:
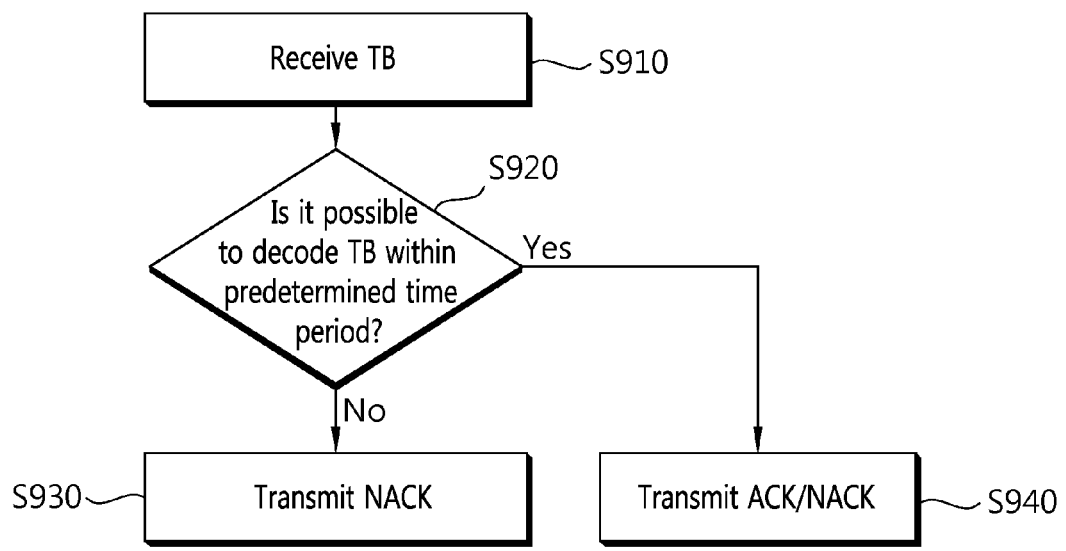
FIG. 9 shows a method of performing a HARQ according to another embodiment of the present invention.

FIG. 9 shows a method of performing a HARQ according to another embodiment of the present invention.

In step S910, a wireless device receives a TB from a BS. The TB may be received on a PDSCH indicated by a PDCCH/EPDCCH.

In step S920, the wireless device decides whether it is possible to decode the TB within a predetermined time period.

In step S930, if the wireless device checks a TB size and decides that it cannot completely decode the TB within the predetermined time period, NACK is transmitted. That is, the NACK is transmitted regardless of a success/failure of the decoding of the TB. If the TB size is too large and thus the wireless device fails to decode the TB within a processing time period, the wireless device may continue decoding as much as possible and may transmit NACK.

In step S940, if the wireless device can decode the TB, ACK or NACK may be transmitted as ACK/NACK.

In general, if a turbo code is applied for the TB, the wireless device performs iterative decoding for increasing a decoding success rate by repetitively decoding a codeword several times. When the number of decoding iterations is increased, a decoding success rate of the TB is increased but a decoding time is also increased. Therefore, similarly to a case where the TA is large, if a time of decoding the TB by the wireless device is insufficient, the wireless device may perform even a small number of iterations to acquire a soft output (e.g., a likelihood ratio of each information bit in the TB) which is a result of decoding the TB. Although a probability of successfully decoding the TB by using only the soft output acquired through the small number of iterations is low, this may be stored and thereafter may be usefully used to combine with next retransmission. That is, this may be a method in which, even in a case where an initially transmitted TB is received but it is determined that successful decoding is impossible with a normal decoding procedure, an indirect decoding scheme is used to acquire information as much as possible from the received TB, and this is used in next decoding. In a normal case, turbo decoding is performed through N iterations, whereas in this method, a resultant value output through the small number of iterations less than N is stored. The turbo decoding may be performed by soft-combining the stored value with a TB received at a later time.

In the aforementioned embodiment of FIG. 8, it can be seen that decoding is skipped for a TB when it is difficult to be decoded in time, and soft combining with a retransmission TB received at a later time is given up. On the other hand, in the embodiment of FIG. 9, it can be seen that decoding is performed as much as possible on the TB even if it is difficult to be decoded in time, and the soft combining with the retransmission TB received at the later time is used.

Upon receiving NACK, under the assumption that a soft output of a corresponding TB is stored in the wireless device, the BS may transmit a retransmission TB for the corresponding TB. That is, the BS may perform retransmission which can achieve a decoding success rate when the soft combination is performed.

The wireless device may provide the BS with information indicating that a soft output of the corresponding TB is stored therein.

If a repetition on the corresponding TB can be persistently performed even after the NACK is reported (for example, if there is no reception of another TB at a specific time after a time of reporting the NACK), the wireless device may perform additional iterative decoding on the corresponding TB to acquire a more accurate soft output.

According to the proposed embodiment, upon receiving a large TB, the wireless device requests retransmission by transmitting NACK due to a processing time limitation. Thereafter, if an additional time capable of resuming or continuing decoding is ensured and thus TB decoding is successful, ACK may be transmitted at a next HARQ cycle.

Now, a proposal of a TB size associated with a CSI reference resource is described.

The CSI reference resource is defined by an RB group corresponding to a band associated with a derived CQI value.

Figure 10:
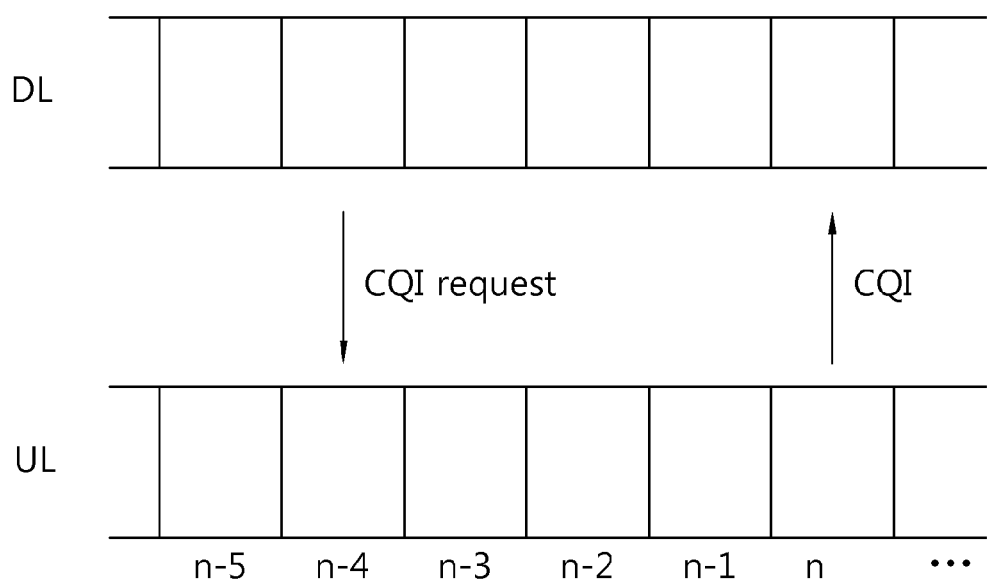
FIG. 10 shows an example of determining a channel state information (CSI) reference resource in aperiodic channel quality indicator (CQI) reporting.

FIG. 10 shows an example of determining a CSI reference resource in aperiodic CQI reporting.

In a subframe n−4, a BS sends to a wireless device a CQI request for requesting CQI transmission on a PDCCH. In a subframe n, the wireless device sends to the BS a derived CQI.

If a resource used to derive the CQI is a CSI reference resource, the wireless device derives the CQI on the basis of CSI-RS or CRS of the subframe n.

Referring to the section 7.2.3 of 3GPP TS 36.213 V10.2.0 (2011-06), a 4-bit CQI table is as follows.

TABLE 6

| CQI index | modulation | code rate x 1024 | efficiency |
| --- | --- | --- | --- |
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

The wireless device reports a largest CQI index among values in the range of 1 to 15 as a CQI value. If the following condition is not satisfied, a CQI index 0 is reported.

<Condition> A single PDSCH transport block with a combination of modulation scheme and transport block size corresponding to the CQI index, and occupying a group of downlink physical resource blocks termed the CSI reference resource, could be received with a transport block error probability not exceeding 0.1.

In other words, if it is determined that a situation where the TB error probability exceeds 0.1 will occur when calculating the CQI, the CQI index 0 is reported other than CQI indices 1 to 15.

In an environment where a sufficient processing time is ensured to the wireless device, a factor of determining a block error rate (BLER) is channel quality such as a signal to interference plus noise ratio (SINR). That is, a BLER value varies depending on a current channel state, and a CQI reported by the wireless device also varies depending thereon. On the other hand, in a situation where a significantly large TA is given, the wireless device cannot have a sufficient processing time, which may be another factor of determining the BLER.

For example, if a TB having a size exceeding a threshold is received in the situation where the wireless device cannot have the sufficient processing time, the wireless device may not be allowed to report a CQI when it is determined that the TB exceeds BLER 10%. The threshold may be a maximum TB size according to which it is determined that the wireless device cannot succeed in decoding within a given time period. However, even if the wireless device does not have a TB size limitation, there may be a problem in that normal CQI reporting is not performed when it is determined as a situation of exceeding the BLER 10% condition. If a low CQI is reported, a BS to which the calculated CQI is reported may have difficulty in determining whether it is caused by a current poor channel state or by an insufficient processing time.

Therefore, it is required to define such that the wireless device can report a CQI corresponding to a large TB even in a situation where a processing time for the TB is insufficient. For example, even in a situation where a BLER of a TB corresponding to a specific CQI exceeds or presumably exceeds 10% due to a processing time limitation, it may be allowed to report a normal CQI if it is determined that the wireless device can perform decoding and can succeed in the decoding.

Likewise, in a case where it is difficult to perform normal decoding within a given time period due to an insufficient capability of the wireless device, it may be allowed to report a normal CQI if an extra time is ensured to continuously perform the decoding.

Even if a TA is too large to be able to normally perform decoding due to the processing time limitation, and as a result, it is determined that a BLER will exceeds 10%, it may be allowed to report a normal CQI when satisfying a specific condition, for example, in which the wireless device can ensure an extra time, or the like.

As one method for enabling a series of the aforementioned operations, it may be specified to assume that the wireless device always has a sufficient processing time when calculating a CQI. Even if a large TA is set in a given environment and thus the processing time is insufficient, when calculating the CQI, the processing time is not considered, but only channel quality is considered in the CQI value. For example, it may be specified that the wireless device calculates the CQI under the assumption that a TA value is set to a sufficiently small value (e.g., 0). For another example, it may also be specified that the wireless device calculates the CQI under the assumption that it has a sufficient processing time for a corresponding TB (or ACK/NACK is transmitted at a sufficiently later time).

CQI reporting may be allowed to purely consider only a channel situation. That is, a CQI index is determined by considering only a measured channel state, instead of considering a surrounding factor of the wireless device.

The BS may transmit a large TB if it is determined that the large TB cannot be normally decoded within a given time period as a result of analyzing a channel environment and a wireless device's environment, or an extra time or the like is ensured and thus decoding can be successfully performed.

If a processing time is insufficient as to a large PDSCH TB scheduled by an EPDCCH, a CSI reference resource and a PDSCH scheduling time may vary. When a CQI request and a PDSCH are scheduled in a subframe n−4 and a CQI is reported in a subframe n, a valid subframe for an original CSI reference resource is the subframe n−4. However, the subframe n−4 is not valid due to an insufficient processing time, and a valid subframe for the CSI reference resource may be determined as a subframe n−5. In this case, since the existing HARQ cycle is 4 subframes, the following operation may be performed.

Subframe n−5: reception of PDSCH (CSI reference resource)

Subframe n−1: transmission of ACK/NACK corresponding to PDSCH

Subframe n: transmission of CQI index

According to the proposed embodiment, it is proposed that the CSI reference resource is used only for a usage of recognizing a channel characteristic and is not used for a usage of recommending a TB size. The BS may interpret that a CQI index indicates only a channel state and does not imply a recommended TB size.

The BS may determine a TB size by considering a TA and ACK/NACK (particularly, NACK) based on PDSCH scheduling. For example, if it is determined that the TA is large, the BS may select a value smaller than a TB size indicated by a CQI index as an actual TB size.

In case of TDD, HARQ ACK/NACK timing exists variously as shown in Table 5. For example, according to the UL/DL configuration 0 of Table 5, if a PDSCH is scheduled in a subframe n, ACK/NACK is transmitted in timing n+4 or n+6. The timing n+4 may have difficulty in decoding due to a processing time limitation in case of a large-sized TB, whereas the timing n+6 may perform successful decoding without the processing time limitation. In case of TDD, it is not desirable to equally apply the aforementioned TB restriction method to all UL-DL configurations. For example, the TB restriction may be applied only for the timing n+4 in the UL/DL configuration 0.

The TB restriction according to the aforementioned embodiment may vary depending on a UE capability, a category, a TA, an antenna configuration, etc. The TB restriction may be activated/deactivated by the BS.

To decrease a signaling overhead for setting the TB restriction, the TB restriction may be applied according to a specific value (e.g., 4 subframes). Alternatively, the TB restriction may be applied according to an upper-limit value or a lower-limit value. Alternatively, a plurality of options may be predetermined and thereafter one of the plurality of options may be selected by an order of the BS.

In addition, if the UL-DL configuration is taken for example, it is required to determine whether the timing n+4 is always assumed between the timing n+4 and the timing n+6, or the timing n+4 and the timing n+6 are independently considered when a CSI reference resource is calculated. If the TB restriction is not applied to the timing n+6, a TB size can be decreased in case of the timing n+4 by considering each of the timing n+4 and the timing n+6.

Even if the wireless device is configured to monitor an EPDCCH UE specific search space (USS), it may be configured to monitor a PDCCH common search space (CSS). This is because a CSS for an EPDCCH is not defined. In addition, a PDCCH USS may be monitored even in a subframe other than a subframe configured to monitor the EPDCCH.

If a TA is large, the EPDCCH may have difficulty in decoding due to a processing time limitation, or may perform 'buffer storing' and 'resuming decoding'. In case of the resuming decoding, since the large TB can be decoded eventually, PDSCH scheduling is possible without the TB restriction (i.e., it is assumed that TA=0). Therefore, the large TB may be configured to perform the resuming decoding while disabling the discarding of the TB.

In addition, it may be assumed that, even if there is a processing time limitation with respect to the EPDCCH USS, there is no processing time limitation with respect to the PDCCH USS or the PDCCH CSS. This is because a combination of PDCCH/EPDCCH monitoring and CSS/USS monitoring may vary for each subframe. Therefore, to which subframe a change of a decoding process or the TB restriction based on the aforementioned embodiment will be applied may be predefined. For example, the processing time limitation may occur when a PDSCH is scheduled with an EPDCCH and a TA is greater than or equal to a threshold, and in this case, a DTX or TB restriction based on the aforementioned embodiment may be applied. The DTX or TB restriction is not applied to a PDSCH scheduled with a PDCCH. If the PDCCH CSS and the EPDCCH USS are simultaneously monitored in one subframe, the DTX or TB restriction may be applied since the processing time limitation may occur.

Figure 11:
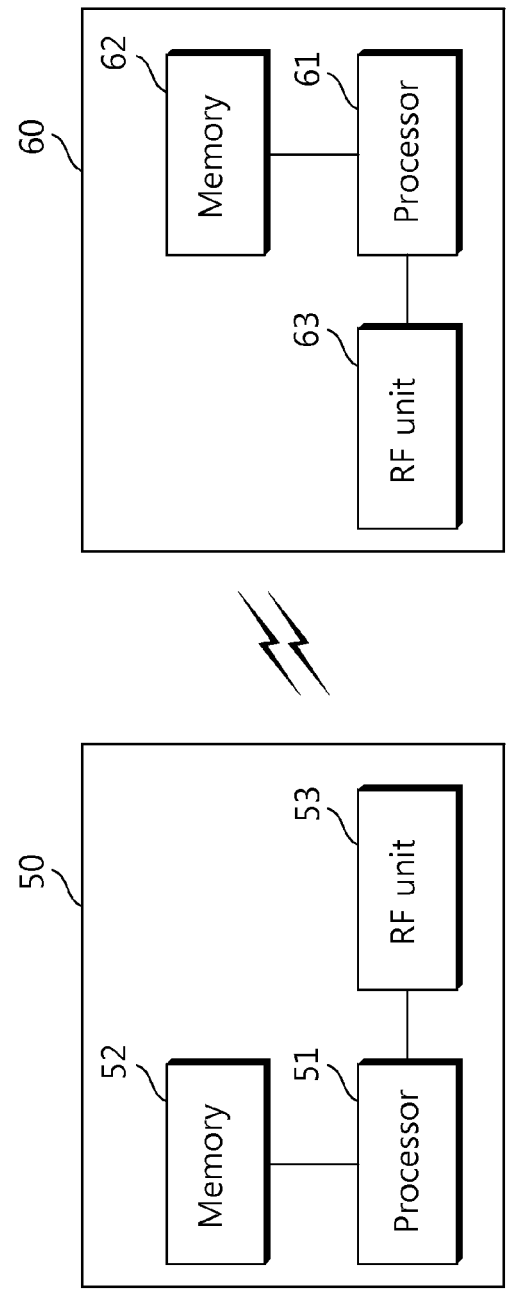
FIG. 11 is a block diagram showing a wireless communication system to implement embodiments of the present invention.

FIG. 11 is a block diagram showing a wireless communication system to implement embodiments of the present invention.

A BS 50 includes a processor 51, a memory 52, and a radio frequency (RF) unit 53. The memory 52 is coupled to the processor 51, and stores a variety of information for driving the processor 51. The RF unit 53 is coupled to the processor 51, and transmits and/or receives a radio signal. The processor 51 implements the proposed functions, procedures, and/or methods. In the aforementioned embodiment, an operation of the BS may be implemented by the processor 51.

A wireless device 60 includes a processor 61, a memory 62, and an RF unit 63. The memory 62 is coupled to the processor 61, and stores a variety of instructions to implement operations of the processor 61. The RF unit 63 is coupled to the processor 61, and transmits and/or receives a radio signal. The processor 61 implements the proposed functions, procedures, and/or methods. In the aforementioned embodiment, an operation of the wireless device may be implemented by the processor 61.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for performing a hybrid automatic repeat request (HARQ) in a wireless communication system, the method comprising:
    receiving, by a wireless device, scheduling information for a transport block (TB) from a base station on a downlink control channel;
    receiving, by the wireless device, the TB from the base station;
    determining, by the wireless device, whether or not decoding on the TB can be performed within a timing at which HARQ acknowledgement (ACK)/not-acknowledgement (NACK) for the TB is transmitted; and
    if it is determined that decoding on the TB cannot be performed within the timing:
        transmitting, by the wireless device, a discontinuous transmission (DTX) signal indicating to the base station that the decoding on the TB is to be skipped;
        discarding the TB; and
        storing a soft output of the TB in a buffer.

2. The method of claim 1, further comprising:
    receiving a retransmission TB for the TB from the base station, wherein a size of the retransmission TB is less than a size of the TB.

3. The method of claim 2, further comprising:
    performing the decoding by combining the soft output of the TB stored in the buffer and the retransmission TB.

4. The method of claim 1, wherein the downlink control channel includes an enhanced physical downlink control channel (EPDCCH).

5. A wireless device for a wireless communication system, the wireless device comprising:
    a radio frequency (RF) unit configured to transmit and receive a radio signal; and
    a processor operatively coupled to the RF unit and configured to:
        receive scheduling information for a transport block (TB) from a base station on a downlink control channel,
        receive the TB from the base station,
        determine whether or not decoding on the TB can be performed within a timing at which hybrid automatic repeat request (HARQ) acknowledgement (ACK)/not-acknowledgement (NACK) for the TB is transmitted, and
        if it is determined that decoding on the TB cannot be performed within the timing, the processor is further configured to:
            transmit a discontinuous transmission (DTX) signal indicating to the base station that the decoding on the TB is to be skipped,
            discard the TB, and
            store a soft output of the TB in a buffer.

6. The wireless device of claim 5, wherein the processor is configured to receive a retransmission TB for the TB from the base station, and wherein a size of the retransmission TB is less than a size of the TB.

7. The wireless device of claim 6, wherein the processor is configured to perform the decoding by combining the soft output of the TB stored in the buffer and the retransmission TB.

8. The wireless device of claim 5, wherein the downlink control channel includes an enhanced physical downlink control channel (EPDCCH).

* * * * *